(12) United States Patent
Woods et al.

(10) Patent No.: US 6,704,407 B1
(45) Date of Patent: Mar. 9, 2004

(54) INTERFACE FOR DIGITAL TELECOMMUNICATIONS SYSTEM

(75) Inventors: Anthony John Woods, Willingham (GB); Joanna Frances Wexler, Huntingdon (GB)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/868,795
(22) PCT Filed: Nov. 30, 1999
(86) PCT No.: PCT/GB99/03976
§ 371 (c)(1), (2), (4) Date: Sep. 18, 2001
(87) PCT Pub. No.: WO00/40055
PCT Pub. Date: Jul. 6, 2000

(30) Foreign Application Priority Data

Dec. 23, 1998 (GB) ............................................. 9828284

(51) Int. Cl.[7] .............................. H04M 7/00; H04J 3/12; H04Q 11/04
(52) U.S. Cl. ................... 379/229; 370/522; 379/221.06; 379/221.14; 379/230; 379/231; 379/234
(58) Field of Search ................................ 370/351, 352, 370/359, 389, 522; 379/201.01, 219, 220.01, 221.06, 221.07, 221.14, 225, 229, 230, 231, 234, 240, 333

(56) References Cited

U.S. PATENT DOCUMENTS

| | | | | |
|---|---|---|---|---|
| 5,537,469 A | * | 7/1996 | Beniston et al. | 379/229 |
| 6,252,955 B1 | * | 6/2001 | Antila et al. | 379/219 |
| 6,259,784 B1 | * | 7/2001 | Antila et al. | 379/229 |
| 6,278,700 B1 | * | 8/2001 | Haster | 370/329 |
| 6,347,138 B1 | * | 2/2002 | Lallukka et al. | 379/220.01 |
| 6,466,665 B1 | * | 10/2002 | Kuorelahti et al. | 379/333 |

* cited by examiner

Primary Examiner—Harry S. Hong
(74) Attorney, Agent, or Firm—Perman & Green, LLP

(57) ABSTRACT

A node (2) and a local exchange (1) communicate with each other over a V5.2 interface created in response to instructions prepared by a computer (22). The method of preparing the instructions involves the steps of allocating identification data to the signal means linking the node and the local exchange so as to enable the latter to determine the identity of the node communicating over the signal link, specifying which C channels are to be transmitted along the signal link means, and, for each specified channel, specifying the C paths, i.e. the type of telecommunications traffic, to be carried thereby.

12 Claims, 6 Drawing Sheets

Fig. 2

Details of the Interface

Details of the Interface's Links

Setting up the C-Channels

Setting up the Signalling in the C-Paths

Summary of Interface Configuration

Interface parameters

| | |
|---|---|
| Name: | Test Interface |
| ID: | 1 |
| Provisioning variant: | 0 |
| Link ID checking: | Check link IDs always |
| Startup behaviour: | V1 Case 2 |
| Startup delay: | 2 |
| Startup allowed during PSTN failure: | No |
| Accelerated unblocking: | Off |
| Restart PSTN signalling: | No |

Associated 2M links:
- U1 i/f.1    ID: 1
- U1 i/f.2    ID: 2
- U1 i/f.3    ID: 3

Subscriber signalling:
PSTN mapping: Finland

| Link | Timeslot | Signalling | C-Channel ID |
|---|---|---|---|
| U1 i/f.1 | 15 | PSTN | 1 |
| U1 i/f.1 | 16 | Vital2 | |
| U1 i/f.2 | 16 | Vital1 | 2 |
| U1 i/f.3 | 31 | ISDN-Ds | 3 |

Select the 'Create' button to create the V5 interface for the configuration
Select the 'Back' button to go back to the New V5 Interface Wizard

[ < Back ]  [ Cancel ]  [ Create ]

*Fig. 6*

INTERFACE FOR DIGITAL TELECOMMUNICATIONS SYSTEM

This application claims the benefit of the earlier filed International Application No. PCT/GB99/03976. International Filing Date, Nov. 30, 1999, which designated the United States of America, and which international application was published under PCT Article 21(2) in English as WO Publication No. WO 00/40055.

FIELD OF THE INVENTION

This invention relates to a method of creating an interface between a node and a local exchange of a digital telecommunications system, and to apparatus for preparing instructions for the creation of such an interface. The invention is particularly applicable to the creation of a V5.2 interface between an Access Node (AN) and a local exchange of an SDH telecommunications system.

BACKGROUND TO THE INVENTION

The node of a telecommunications system is programmed with node manager software which enables the node to be configured and maintained. During the installation of the node, that software is also used to create an interface between the node and its local exchange of the telecommunications system in response to a set of instructions which will include various parameters input by an engineer installing the interface.

In general, the manager software will be able to warn the engineer if any of the parameters have been incorrectly set. However, correcting the parameters can be a time-consuming and confusing process since some of the parameters are interrelated such that the correction of one parameter can have a bearing on the requirements of the other parameters.

SUMMARY OF THE INVENTION

According to the invention, there is provided a method of creating an interface between a node and a local exchange of a digital telecommunications system to enable a number of different types of telecommunications traffic to pass along a plurality of channels from one to the other of the node and the local exchange over signal link means, the method comprising performing, in sequence, the steps of:

(a) allocating identification data to the signal means to enable the local exchange to determine the identity of the node;

(b) specifying which of the channels are to be transmitted along the signal link means; and (c) for each specified channel, specifying the type of telecommunications traffic to be carried thereby.

This particular sequence of steps facilitates the creation of an interface since any important errors in or omissions from the information provided at each step can be rectified before the subsequent steps occur and without affecting the information (if any) provided for the previous steps.

The steps of the method can be performed by inputting appropriate data into a suitable data processing device, for example a lap top computer, which then transmits the data to the node as a set of instructions for the latter to set up the interface.

Preferably, the steps of the method constitute the preparation of instructions for the setting up of the interface, the method comprising the further step of subsequently implementing the instructions. It will be appreciated that the sequence of steps involved in the implementation of the instructions need not necessarily be the same as the sequence of steps involved in preparing the instructions.

Preferably, the signal link means comprises a plurality of data links, for example cables, physically connecting the node to the local exchange. In this case, a respective identification is preferably allocated to each link.

Preferably, the interface allows various overhead signals for the telecommunications traffic to pass from one to the other of the node and local exchange.

The telecommunications traffic can be arranged in a succession of frames having time slots for channels for the overhead signals, in which case steps (b) and (c) are preferably performed by specifying along which link each of those channels is to be conveyed, and for each channel, the nature of the overhead signal to be carried thereby.

Preferably, step (c) also involves specifying which of said channels is to carry vital signals for maintaining said interface. The method preferably also includes the step of checking whether a channel for said signals has been allocated, and preventing the implementation of the instructions until such an allocation has been made. Thus, the risk of setting up an interface with no channel for vital control signals is avoided.

The method preferably includes the further step of ensuring that, before the instructions are implemented, a back up channel, for carrying the vital control signals in the event of the failure of the first said channel for those signals has been allocated.

The local exchange may be connected to each of a plurality of nodes via a respective interface created by this method, the method therefore including the additional step of allocating a respective identification to the interface.

Preferably, that additional step is the first step of the method.

Preferably, the interface is a V5.2 interface.

The invention also lies in data processing apparatus for preparing instructions for the creation of an interface between a node and the local exchange of a digital telecommunications system, the apparatus comprising data input means for enabling the apparatus to receive the data necessary to prepare the instructions, and signal output means for supplying a signal, which contains said instructions, to the system, wherein the apparatus is so arranged as to require the following data for the instructions to be input into the apparatus in the following sequence:

a) data identifying signal link means via which the node and local exchange are to communicate with each other;

b) data specifying the communications channels to be transmitted over the signal link means; and c) for each such channel, data specifying the type of telecommunications traffic to be carried thereby.

BRIEF DESCRIPTION OF THE DRAWINGS

The invention will now be described, by way of example only, with reference to the accompanying drawings in which:

FIGS. 2 to 5 are sample displays generated by a PC for prompting an operator to input data on various parameters for each interface; and FIG. 6 is also a sample display, this time providing a summary of the information which has been input into the computer.

DETAILED DESCRIPTION

Figure 1:
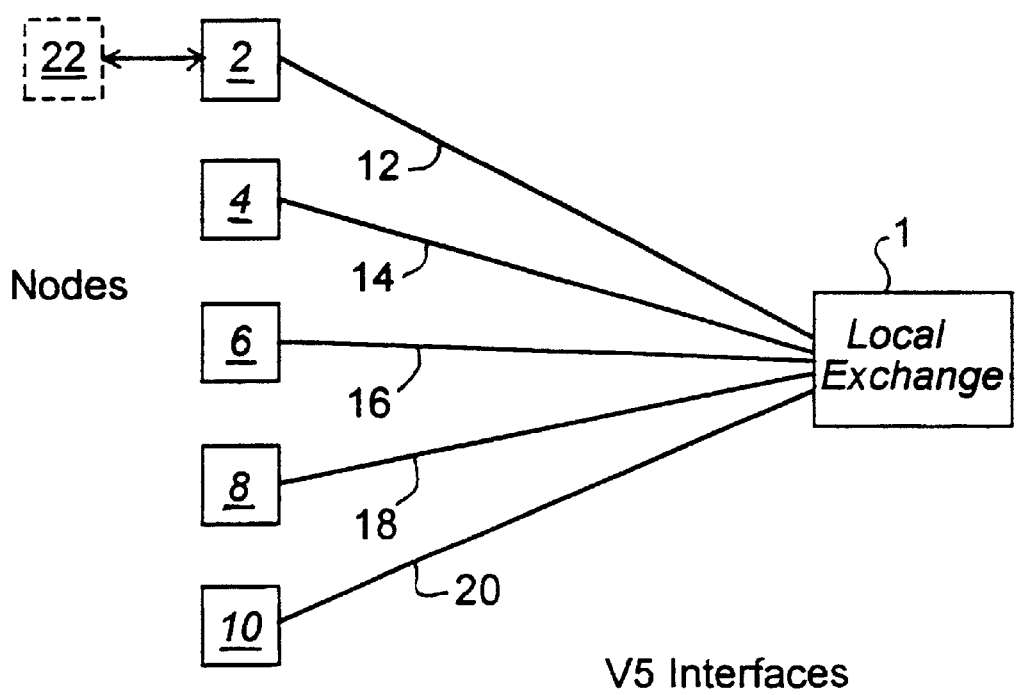
FIG. 1 is a schematic block diagram showing a local exchange and a number of nodes of an SDH telecommunications system, each node communicating with the local exchange over a V5.2 interface created by a method in accordance with the invention.

With reference to FIG. 1, a local exchange 1 of an SDH telecommunications system is connected to each of the nodes 2, 4, 6, 8 and 10. The nodes are physically connected to the local exchange 1 through corresponding bundles of optical fibres 12, 14, 16, 18 and 20. Each fibre provides a 2 Mb/s signal link between the node to which it is connected and the local exchange.

The nodes shown in FIG. 1 are identical, and only the node 2 will therefore be described. That node is known as an Access Node (AN), and contains various different units, for example, a Node Control Unit, type A, a number of Public Switched Telephone Network (PSTN) units and a number of Integrated Services Digital Network (ISDN) units. The node is programmed with management software for managing various functions of the node, including the setting up of a V5.2 interface with the local exchange 1. That software can be accessed through a lap top computer 22 connected to the node 2.

Software in the lap top computer 22 includes a Create Wizard application for creating a V5.2 interface between the node 2 and the local exchange 1. If a user instructs the lap top computer to open the Create Wizard application, the PC checks whether a V5.2 interface has already been created between the node 2 and local exchange 1, and if not opens the application. If, however, a V5.2 interface already exists, the PC informs the operator of this and/or opens another application (such as for reconfiguring the interface).

Figure 2:
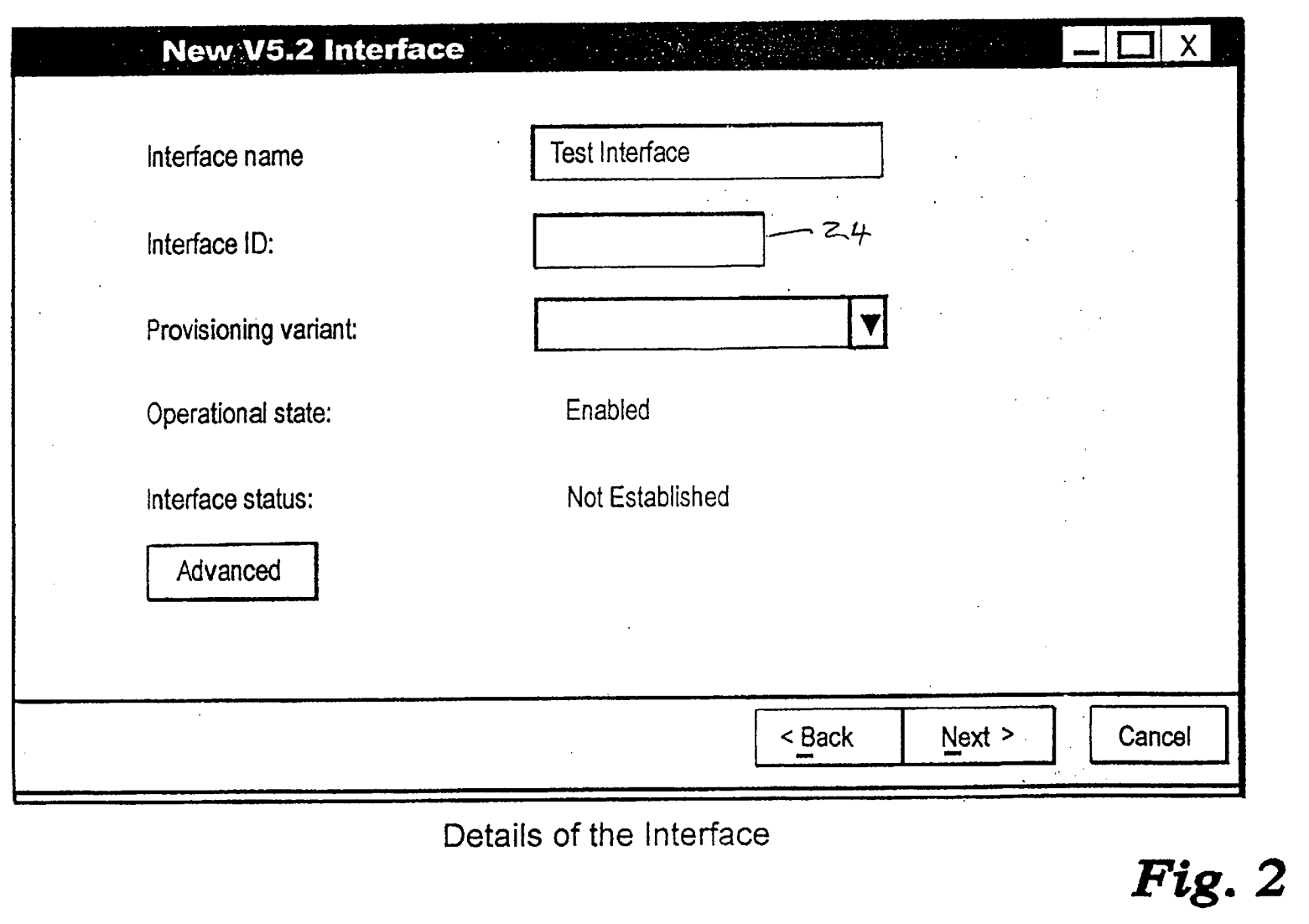

When opened, the Create Wizard initially causes the display of the PC to display the window shown in FIG. 2.

Each of the V5.2 interfaces is identified by a respective code, and the windows shown in Figure invites the user to input a suitable identification code at box 24. In this case, the code identifies the interface to be formed between the node 2 and local exchange 1. Codes for all the possible V5.2 interfaces between the local exchange 1 and the nodes may already have been supplied to the local exchange 1, in which case the code entered at box 24 will have to be selected by the user from one of the existing codes which has not already been allocated to an interface already created with another node.

Figure 3:
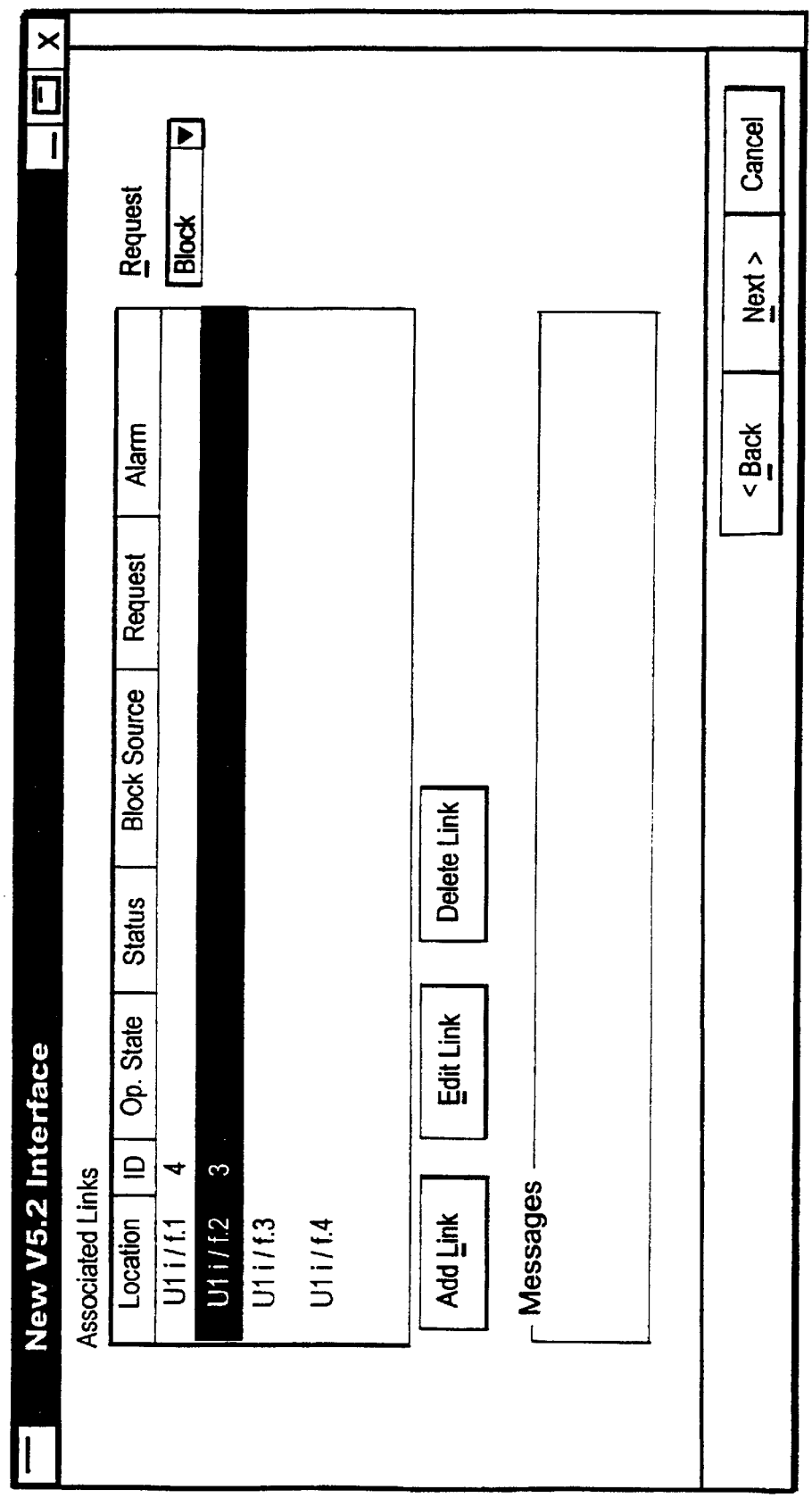

Once the code has been entered into the lap top computer 22, the window shown in FIG. 3 is presented to prompt the user to specify which of the fibre optic cables (in this case the cables in the bundle 12), is connected to which port of the node 2. This enables the local exchange 1 to identify which node is connected via those 2 Mb/s links.

The window shown in FIG. 3 includes a table, the left hand column of which indicates a slot (i.e. a card) in the node, and an interface for the fibre optic cables connected to the slot. In the present example, there is one slot, designated U1, having connections for four fibre optic cables through interfaces i/f 1–4. The operator inputs numbers identifying the relevant optical fibres (in this case 4 and 3) in the column headed ID, to indicate which fibre is connected to the slot U1 through which interface. The table also includes the column headed "block source" which enables the user to prevent traffic from travelling along a specified fibre. Blocking or unblocking a fibre has to be done when the V5.2 interface is not operating, which in this case is inevitable as the V5.2 interface has yet to be created.

The identity code for the fibres enables the local exchange to identify which cable is connected to which node.

The table has a number of other columns which are concerned with the altering of a V5.2 interface, but these are not relevant to the process of creating the interface. Various other option buttons in the table are self-explanatory.

Figure 4:
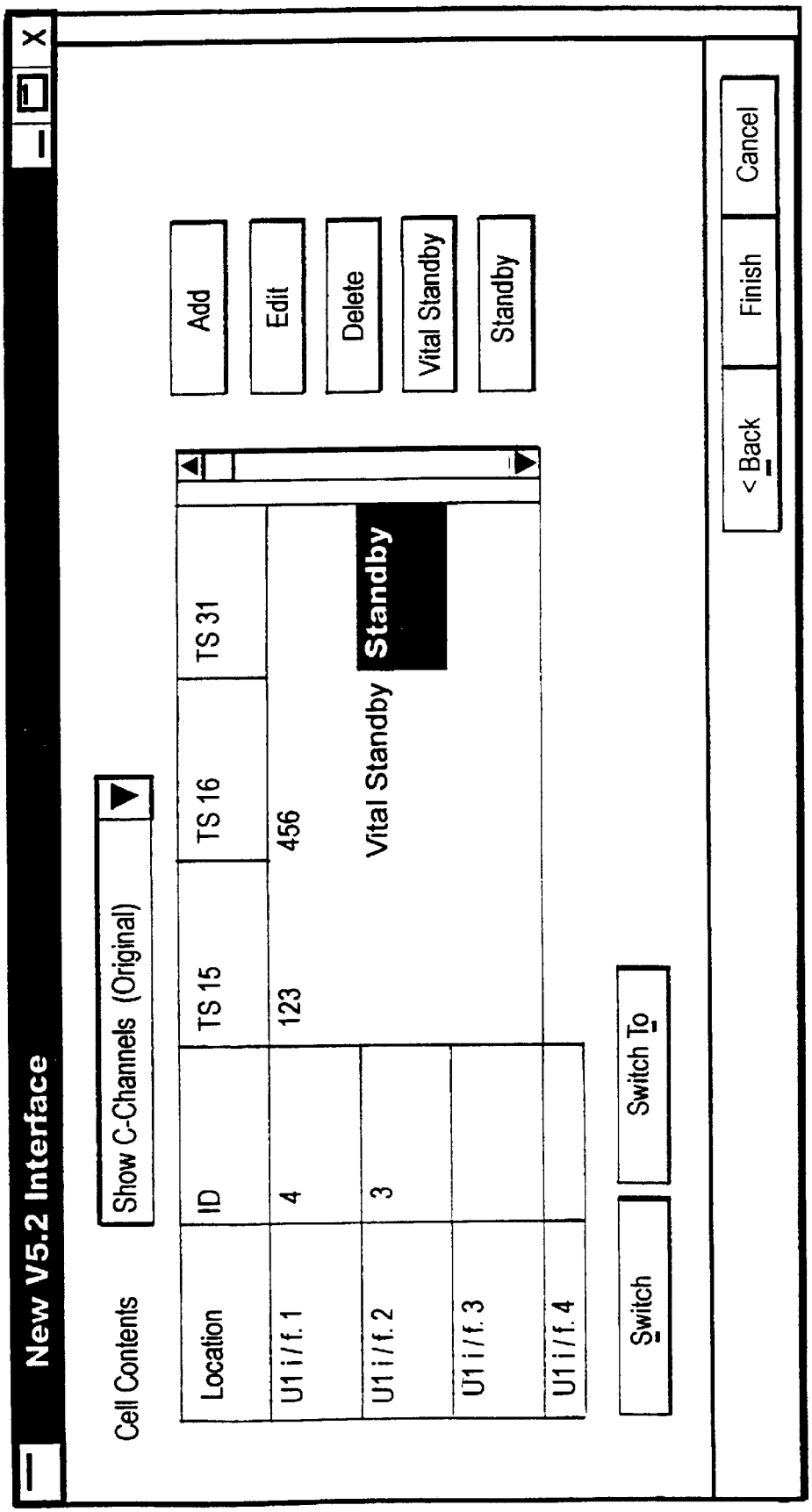

Once the identities of the 2 Mb/s links have been entered, the Create Wizard on the PC displays the window shown in FIG. 4. This window also has a table, which incorporates the information on the link location and identities of optical fibres entered in the previous window. In addition, the table includes columns which represent the time Blots for overhead signals between the node 2 and the local exchange 1. In accordance with relevant standards, those time slots are time slots 15, 16 and 31.

The portion of the table which is not shaded contains boxes in which the user can enter the identifications of the C channels to be carried on the time slots and fibres represented in the table. Thus, in the present case, channel No. 123 is to be carried on fibre No. 4 and via time slot 15, whilst time slot 16 is to carry channel No. 456 on the same fibre. Time slot 16 on fibre No. 3 is to provide a "vital" standby channel for use if the channel which is to carry the control signals for the V5.2 interface fails. A further standby channel is reserved on time slot 31 on the same fibre, and this can be used if a channel for other overhead signals fails.

Figure 5:
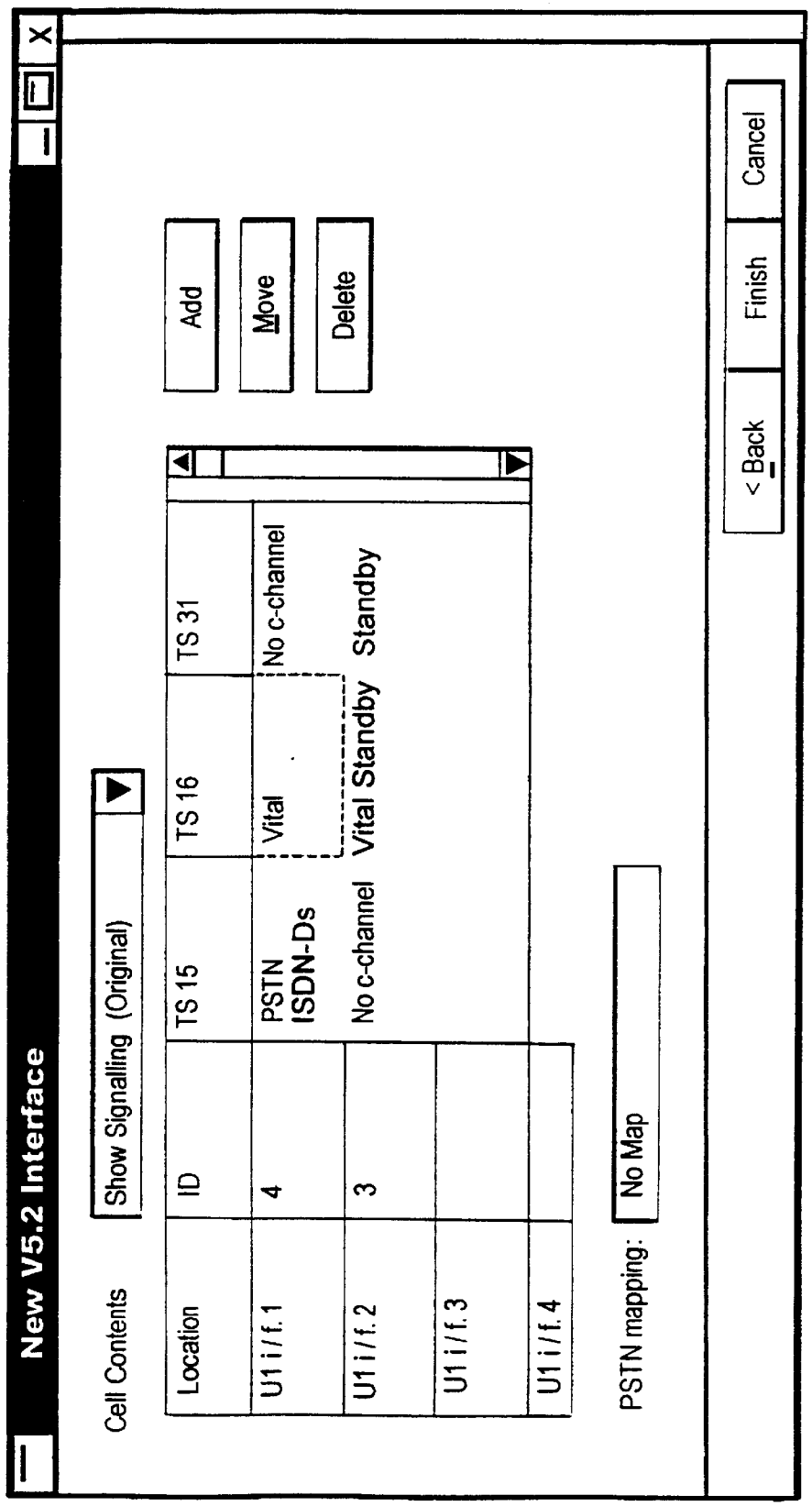

The next window to be presented is shown in FIG. 5, and it includes a table corresponding to the table shown in FIG. 4. In this case, the user has to specify the C-paths, i.e. the type of control signals to be conveyed on the available channels. Thus, channel No. 123 is used to convey PSTN and ISDN control signals, whilst channel No. 456 is to carry the control signals for that V5.2 interface.

The next window to be displayed on the Lap top computer is shown in FIG. 6, and just provides a summary of the data entered at the previous steps. The window includes a create button for causing the Lap top computer to pass the data to the management software in the node 2 to implement the instructions to create the V5.2 interface on the basis of the data supplied by the user.

Although the described system is set up to provide only one V5.2 interface for the node, the method according to the invention can be used to set up a plurality of V5.2 interfaces between the node and a local exchange (where the system permits).

What is claimed is:

1. A method of creating an interface between a node and a local exchange of a digital telecommunications system to enable a number of different types of telecommunications traffic to pass along a plurality of channels from one to the other of the node and the local exchange over signal link means, the method comprising performing, in sequence, the steps of:
   (a) allocating identification data to the signal link means to enable the local exchange to determine the identity of the node;
   (b) specifying which of the channels are to be transmitted along the signal link means; and
   (c) for each specified channel, specifying the type of telecommunications traffic to be carried thereby.

2. A method according to claim 1, in which steps (a)–(c) are performed by inputting appropriate data into a suitable data processing device, which then transmits the data to the node as a set of instructions for the latter to set up the interface.

3. A method according to claim 2, in which instructions for the setting up of the interface are prepared by performing steps (a)–(c), the method comprising the further step of subsequently implementing the instructions.

4. A method according to claim 1, in which the signal link means comprises a plurality of links physically connecting the node to the local exchange, and in which a respective identification is allocated to each link.

5. A method according to claim 4, in which the interface is to allow various overhead signals for the telecommunications traffic to pass from one to the other of the node and local exchange, the telecommunications traffic being arranged in a succession of frames having time slots for channels for the overhead signals, and steps (b) and (c) being performed by specifying along which link each of those channels is to be conveyed, and for each channel, the nature of the overhead signal to be carried thereby.

6. A method according to claim 5, in which step (c) also involves specifying which of said channels is to carry vital signals for maintaining said interface.

7. A method according to claim 6, in which the method preferably also includes the step of checking whether a channel for said signals has been allocated, and preventing the implementation of the instructions until such an allocation has been made.

8. A method according to claim 7, in which the method includes the further step of ensuring that, before the instructions are implemented, a back up channel, for carrying the vital signals in the event of the failure of the first said channel for those signals has been allocated.

9. A method according to claim 1, in which the local exchange is connected to each of a plurality of nodes via a respective interface so created, the method including the additional step of allocating a respective identification to the interface.

10. A method according to claim 9, in which the additional step of allocating an identification to the interface is the first step of the method.

11. A method according to claim 1, in which the interface is a V5.2 interface.

12. Data processing apparatus for preparing instructions for the creation of an interface between a node and the local exchange of a digital telecommunications system, the apparatus comprising:

data input means for enabling the apparatus to receive the data necessary to prepare the instructions; and signal output means for supplying a signal, which contains said instructions, to the system, wherein the apparatus is so arranged as to require the following data for the instructions to be input into the apparatus in the following sequence:

a) data identifying signal link means via which the node and local exchange are to communicate with each other;

b) data specifying the communications channels to be transmitted over the signal link means; and c) for each such channel, data specifying the type of telecommunications traffic to be carried thereby.

\* \* \* \* \*